United States Patent [19]

Behle et al.

[11] 4,440,380

[45] Apr. 3, 1984

[54] WEDGEBALL VALVE

[75] Inventors: Gunter R. Behle, St. Peters; John A. Hrinsin, St. Louis, both of Mo.

[73] Assignee: ACF Industries, Incorporated, New York, N.Y.

[21] Appl. No.: 372,590

[22] Filed: Apr. 28, 1982

[51] Int. Cl.³ .................... F16K 51/00; F16K 25/00
[52] U.S. Cl. ................................ 251/144; 251/162; 251/176; 251/192
[58] Field of Search .............. 251/176, 162, 163, 160, 251/192, 144

[56] References Cited

U.S. PATENT DOCUMENTS

| | | | |
|---|---|---|---|
| 2,579,567 | 12/1951 | Greene | 251/144 |
| 2,696,968 | 12/1954 | Fillips | 251/192 |
| 3,238,965 | 3/1966 | Masheder | 251/176 |
| 3,286,735 | 11/1966 | Yindrock | 251/144 |
| 3,367,623 | 2/1968 | Piel | 251/144 |
| 3,591,131 | 7/1971 | Carlson | 251/144 |
| 3,614,056 | 10/1971 | Alvarez | 251/144 |
| 3,661,355 | 5/1972 | Rawstron et al. | 251/144 |
| 3,753,442 | 8/1973 | Tauber | 251/144 |
| 4,311,298 | 1/1982 | Carlson | 251/144 |
| 4,322,056 | 3/1982 | Lew et al. | 251/192 |

*Primary Examiner*—A. Michael Chambers

*Attorney, Agent, or Firm*—Henry W. Cummings; J. Joseph Muller

[57] ABSTRACT

At least one ball valve segment is located within a partial valve cage mounted within a tank. The cage is integral with a valve housing removably mounted within a tank mounting flange. The housing includes an inclined sealing surface which the ball valve segment engages in closed position. A lading outlet chamber is located below the inclined sealing surface. An operating shaft is inclined with respect to the outlet chamber. Inclined openings are provided in the valve housing and in the outlet chamber through which the operating shaft passes. The operating shaft includes an eccentric head which is located within a non-round slot in the ball valve segment. Rotation of the operating shaft rotates the eccentric head which drives the valve segment between open and closed positions. Preferably a pair of ball valve segments located approximately 180° apart are connected with supports or ribs. The valve segment which closes the opening into the discharge chamber is larger. The contour of the eccentric head is such that the smaller valve segment is located outwardly from the center of the discharge opening in the valve housing when the larger valve segment is in open position to minimize flow restriction. The smaller valve segment is cam shaped to urge the larger portion into closed and sealed position.

13 Claims, 4 Drawing Figures

WEDGEBALL VALVE

BACKGROUND OF THE INVENTION

Presently, ball valves are of the straight flow through in line type such as illustrated in U.S. Pat. Nos. 3,367,623 and 3,614,056, or of the type which forces a change in flow direction such as angle or tee ball valves. See U.S. Pat. No. 3,286,735. These constructions have been proposed for use as commodity discharge valve on tanks or railroad tank cars.

With the advent of the Association of American Railroads (AAR) protective regulations, valves located below and outside of tank cars, must now be protected against opening, or otherwise being damaged, when the tank car is involved in an accident. Protective means presently employed are heavy and costly skids or locating the valve inside the tank. See AAR Tank Car Specifications, Regulation E-10, (copy in application file).

Valves located inside the tank have economic and size restrictions imposed upon them. See U.S. Pat. Nos. 3,591,131, 3,661,355 and 3,286,735. In order to avoid costly skids, either separate or as part of the tank mounting flange, the internally located valves must be held to given size which in turn limits the discharge flow rate. Conversely, in order to optimize flow rates, conventional valves must have relatively large inlet ports in relation to the outlet port.

U.S. Pat. No. 2,579,567 discloses a valve member extending through an inclined valve housing. The valve member is movable longitudinally relative to the housing between a closed position engaging a valve seat and an open position allowing entry or exit of a heat transfer medium. However, the lading valve is located within the heat transfer medium discharge conduit and thus a skid or other protective device would be required to comply with the above AAR regulations.

A Homestead Ballcentric ® valve (Brochure in application file, Homestead Valve Manufacturing Company, P.O. Box 2585, Bethlehem, Pa. 18001, (215) 868-4061), comprises a ball segment. However, the segment is shaped differently than the valve segment(s) of the present invention. Furthermore, the Ballcentric rotates 90° between open and closed position and is not cammed into closed and seated position.

SUMMARY OF THE INVENTION

In accordance with the present invention at least one ball valve segment is located within a partial valve cage mounted within a tank. The cage is integral with a valve housing removably mounted within a tank mounting flange. The housing includes an inclined sealing surface which the ball valve segment engages in closed position. A lading outlet chamber is located below the housing and the inclined sealing surface. An operating shaft is inclined with respect to the outlet chamber. Inclined openings are provided in the valve housing and in the outlet chamber through which the operating shaft passes. The operating shaft includes an eccentric head which is located within a non-round slot in the ball valve segment. Rotation of the operating shaft rotates the eccentric head which drives the valve segment between open and closed positions. Preferably a pair of ball valve segments located approximately 180° apart are connected with supports or ribs. The valve segment which closes the opening into the discharge chamber is larger.

The contour of the eccentric head is such that the smaller valve segment is located outwardly from the center of the discharge opening in the valve housing when the larger valve segment is in open position to minimize flow restriction.

Cam means are provided whereby the larger valve segment is urged into closed and seated position.

IN THE DRAWINGS

DESCRIPTION OF PREFERRED EMBODIMENTS

Figure 1:
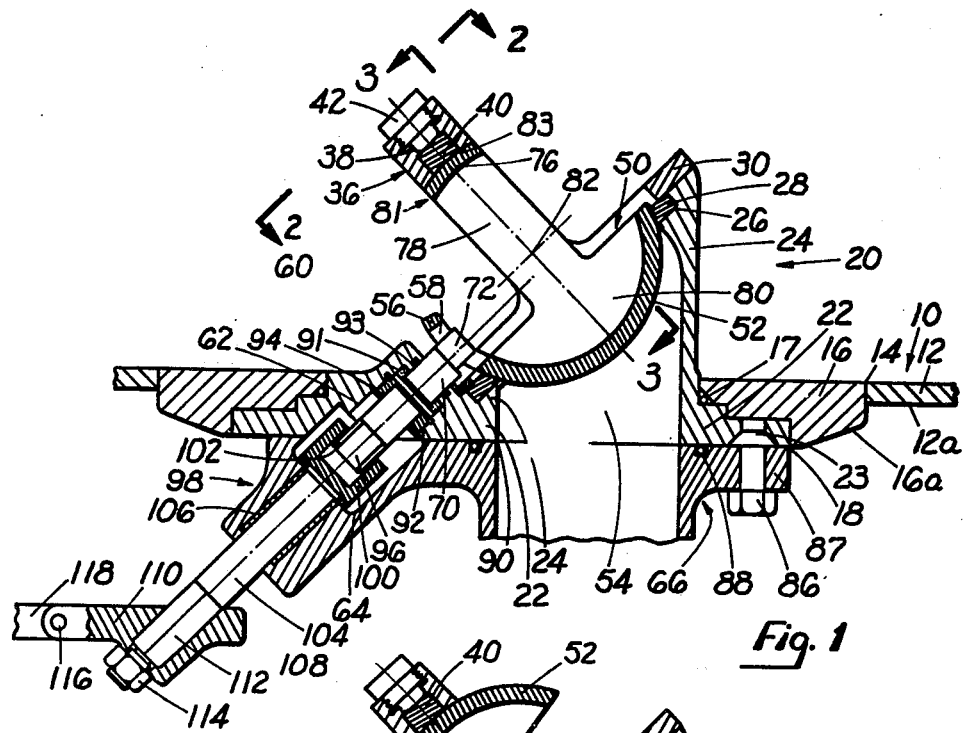
FIG. 1 is a vertical sectional view of the wedgeball assembly of the present invention.
Figure 2:
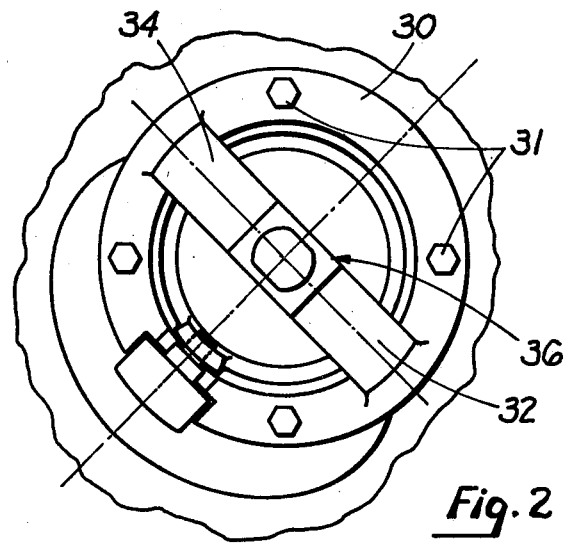
FIG. 2 is a view looking in the direction of the arrows along the line 2—2 in FIG. 1.

In the drawings, a railway tank car 10 includes a tank bottom 12 having an opening 14 into which is located a tank mounting flange 16. Mounting flange 16 includes an opening 18 on its internal surface into which is inserted a valve housing indicated generally at 20. The housing includes a flange portion 22 located within the slot and is held in place with fasteners 23. An elongated body portion 24 extends upwardly therefrom. Body portion 24 is generally cylindrical. However, the height of the body portion varies from the vertical extent shown on the right hand side of FIG. 1 to the relatively short body portion extent 24 shown on the left side. The upper portion of body portion 24 includes a slot 26 which receives a seal 28. A partial valve cage 30 holds seal 28 in place, and is held in place on body portion 24 by fasteners 31, as shown in FIG. 2. Cage 30 includes a pair of integral inwardly extending legs 32 and 34 (FIG. 2). Legs 32 and 34 engage and support another housing portion 36. Housing portion 36 includes an opening 38 into which is inserted an insert 40. An adjusting screw 42 is used to control the extent that insert 40 projects inwardly from housing portion 36.

Located within the housing is a wedgeball indicated generally at 50. Wedgeball 50 includes at least one arcuate segment 52 which in closed position extends and closes the opening 54 located between housing body portions 24. Segment 52 further includes a tap or extension 56 having a non-round opening therein 58.

Figure 3:
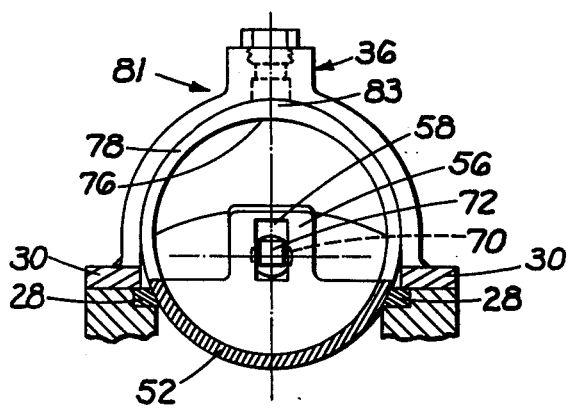
FIG. 3 is a view looking in the direction of the arrows along the line 3—3 in FIG. 1.

An operating shaft for the valve segment is indicated generally at 60. This operating shaft passes through an opening 62 in the housing 20, and through an opening 64 in outlet chamber 66. Shaft 60 includes an upper shaft operating portion 70 preferably having an eccentric portion 72 integral therewith. As shown in FIG. 3 the eccentric portion 72 is offset with respect to the shaft portion 70. Eccentric portion 72 extends into the opening 58 in segment extension 56. Valve 50 preferably includes a second smaller segment 76 which when segment 52 is in closed position, is located within the housing portion 36 and is in engagement with the insert 40. The segments 52 and 76 are rendered integral by means of supports or ribs 78 and 80 which extend outwardly from an axis or pivot point 82. It will be apparent that when shaft portion 70 and eccentric 72 rotate, that this rotation will drive segments 52 and 76 approximately 180° between open and closed positions relative to housing portion 24 and seal 28.

Figure 4:
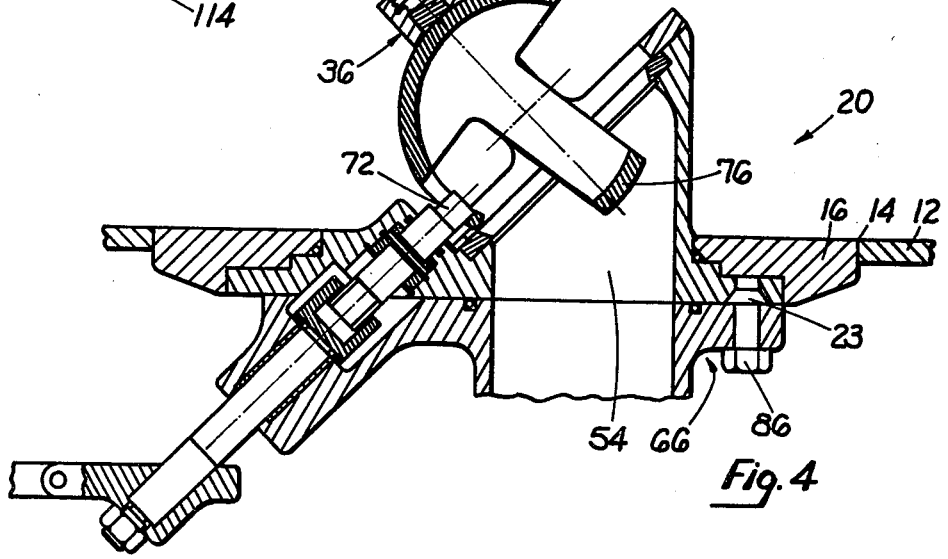
FIG. 4 is a view similar to FIG. 1 illustrating the wedgeball valve in open position.

The contour of the eccentric portion 72 is preferably such that when the valve segment 52 is in open position and is in engagement with the insert 40, the small segment 76 is displaced upwardly from the center line (FIG. 4) of the discharge opening 54. Discharge opening 54, of course, communicates with a discharge opening 84 and outlet chamber 66. It is thus seen that the segment 76, because it is located upwardly from the center line, impedes flow of lading through the housing 20 to a lesser extent than would be the case if it were located on the center line in open position.

Preferably, means 81 are provided to cam larger segment 52 into closed and seated position in engagement with seal 28. In one embodiment, this cam means comprises an extension or projection 83 provided on smaller segment 76 as shown best in FIG. 3. The extension or projection, when the wedgeball is rotated into closed position engages insert 40 in housing portion 36 and urges larger segment 52 into closed and seated position engaging seal 28. See FIG. 3.

Countersunk fasteners 23 hold the housing in engagement with the mounting flange 16. Fasteners 86 preferably located on the same bolt circle as fasteners 23, but spaced laterally therefrom, hold the outlet chamber 66 in engagement with the flange portion 22 of the housing 20. An O-ring seal 17 is located between the housing portion 24 and the mounting flange 16 and an O-ring 88 is located between the outlet chamber 66 and the housing mounting flange portion 22. A shear plane 90 is defined by the abutting surfaces of the outlet chamber flange portion 87 and the housing flange portion 22.

A packing 91 is provided for shaft portion 70. A packing nut 92 holds the packing in place. A snap ring 94 prevents loosening of the packing nut. Shaft portion 70 includes a lower non-round end 96. A lower operating shaft member 98 includes an upper connection portion 100 having a non-round slot 102. Shaft portion 98 includes a round portion 104 which extends through a fixed bearing 106 located within outlet chamber 66. The lower end 108 of the operating shaft is provided with a handle 110. Non-round portions 112 hold these members in operative engagement. In addition, a lock nut 114 is located on the lower end of shaft portion 108. Handle 110 may include a pivot point 116 and a handle extension 118 provided to make rotation of shaft 98 easier.

It will be apparent that when handle connection portion 110 is rotated, shaft 98 is rotated and depending connection portion 96 of upper operating shaft 70 is rotated. Thereby eccentric 72 is rotated and valve segment 52 may be moved between the closed position shown in FIG. 1 and the open position shown in FIG. 4. In open position, lading may exit through the discharge openings 54 and 84 in the outlet chamber.

With the valve in closed position in transit, in the event that the outlet chamber 66 is impacted, the outlet chamber will drop off along the shear line 90 because of the shearable fasteners 86. In addition, the connection portion 100 will drop from the non-round portion 96. Thus the valve will remain in the closed and seated position in the event of such an impact. Moreover, because of the clearance due to opening 62, the non-round end 96 is available to move the valve to the open position after such an impact if it were necessary to remove the lading.

It is noted that with the exception of the taper 16a located on the mounting flange 16, which must be present to the extent that the mounting flange 16 extends more than one inch below the lower surface 12a of the tank bottom 12, no heavy skid is required to comply with the above mentioned AAR regulations. Thus a saving in weight and cost is achieved with the construction of the present invention.

What is claimed is:

1. A valve assembly comprising:
    at least two spaced ball valve segments located within a valve housing mounted within a tank; said housing including a cage extending into said tank and having an inclined sealing surface which at least are of said ball valve segments engages in closed position; a lading outlet chamber located below said inclined sealing surface and being in fluid communication with the passage through said cage; an operating shaft inclined with respect to the axis of said outlet chamber; said operating shaft passing through inclined openings provided in the valve housing and in the outlet chamber; said operating shaft including connecting means for drivably engaging and rotating said ball valve segments; whereby movement of the operating shaft rotates said valve segments between open and closed positions, whereby one of said segments seats on said sealing surface in said closed position.

2. A valve assembly according to claim 1, wherein said segments are located approximately 180° apart and are connected with supports or ribs.

3. A valve assembly according to claim 2, wherein said second segment comprises a cam surface to move said larger segment into closed and seated position.

4. A valve assembly according to claim 2, wherein the valve segment which closes the opening into the discharge chamber is larger.

5. A valve assembly according to claim 4, wherein said operating shaft includes an eccentric head located within a non-round opening in said valve segment.

6. A valve assembly according to claim 5, wherein the contour of the eccentric is such that the smaller valve segment is located outwardly from the center of the discharge opening in the valve housing when the larger valve segment is in open position.

7. A valve assembly according to claim 1, wherein said housing is mounted within a tank mounting flange.

8. A valve assembly comprising:
    at least two spaced apart ball valve segments located within a valve housing mounted within a tank; said housing including a cage extending into said tank having an inclined sealing surface which at least one of said ball valve segments engages in closed position; a lading outlet chamber located below said inclined sealing surface, and being in fluid communication with the passage through said cage; an operating shaft inclined with respect to the axis outlet chamber; said operating shaft passing through inclined openings provided in the valve housing and in the outlet chamber; said operating shaft including connectng means for drivably engaging and rotating said ball valve segment; said operating shaft including an eccentric head located within a non-round opening in at least one of said valve segments; whereby movement of the operating shaft rotates the valve segments between open and closed positions, whereby one of said segments seats on said sealing surface in said closed position.

9. A valve assembly according to claim 8, wherein the contour of the eccentric is such that the smaller valve segment is located outwardly from the center of the discharge opening in the valve housing when the larger valve segment is in open position.

10. A valve assembly comprising:
at least a pair of spaced ball valve segments located within a valve housing mounted within a tank including a cage located within said tank; said segments located approximately 180° apart and connected with supports or ribs, and including a larger segment and a smaller segment; said cage including an inclined sealing surface larger which the ball valve segment engages in closed position; a lading outlet chamber located below said inclined sealing surface, and being in fluid communication with the passage through said cage; an operating shaft inclined with respect to the axis outlet chamber; said operating shaft passing through inclined openings provided in the valve housing and in the outlet chamber; said operating shaft including connecting means for drivably engaging and rotating said ball valve segments; whereby movement of the operating shaft drives the valve segments between open and closed positions.

11. A valve assembly according to claim 10, wherein said smaller segment comprises a cam surface to move said larger segment into closed and sealed position.

12. A valve assembly according to claim 11, wherein said operating shaft includes an eccentric head located within a non-round opening in said valve segment.

13. A valve assembly according to claim 11, wherein the contour of the eccentric is such that the smaller valve segment is located outwardly from the center of the discharge opening in the valve housing when the larger valve segment is in open position.

* * * * *